Dec. 12, 1939.    W. S. WOLFRAM    2,183,000
CLUTCH
Filed April 11, 1938
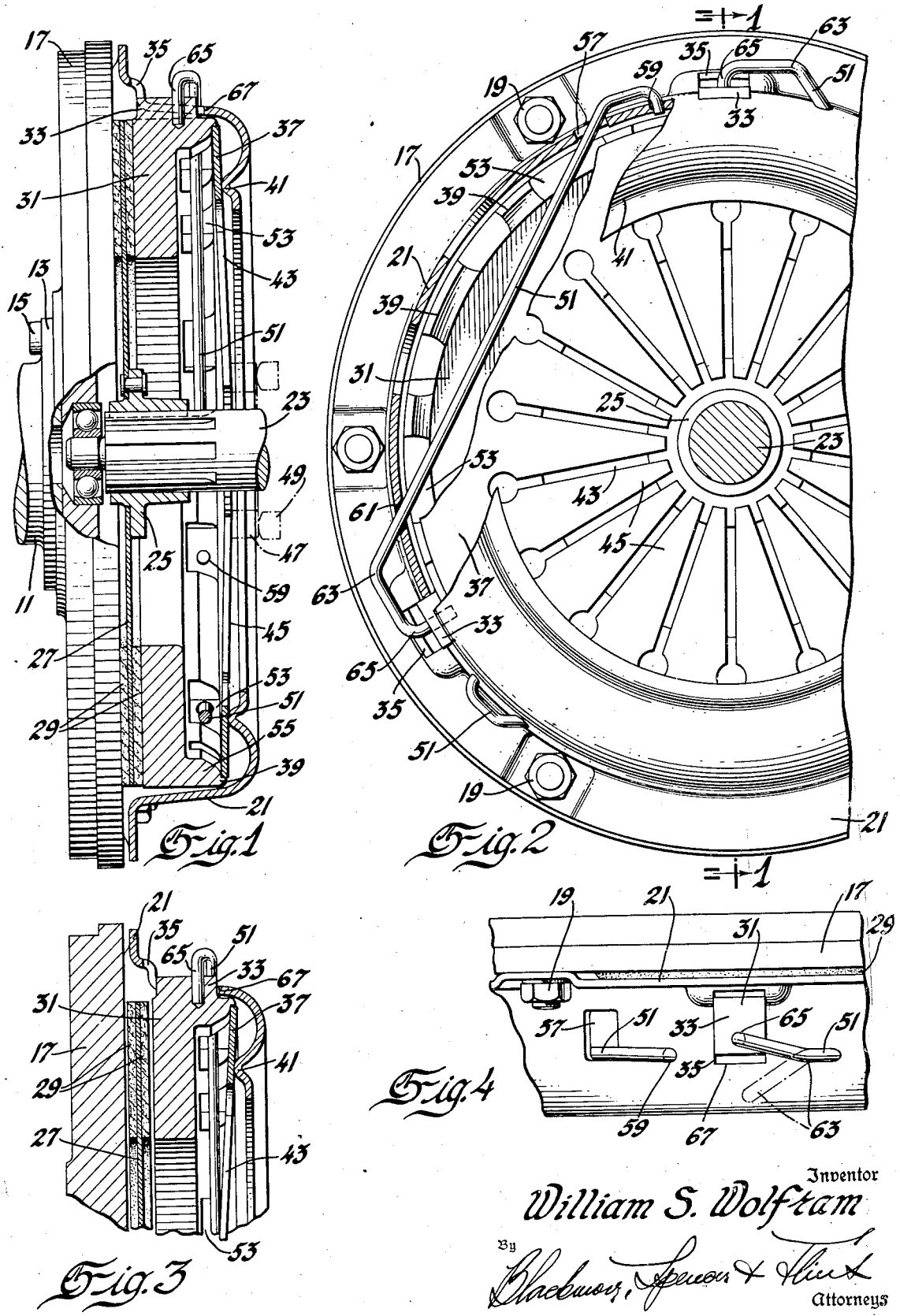
Inventor
William S. Wolfram
By Blackmore, Spencer & Flint
Attorneys Patented Dec. 12, 1939

2,183,000

UNITED STATES PATENT OFFICE 2,183,000

CLUTCH

William S. Wolfram, Dayton, Ohio, assignor to General Motors Corporation, Detroit, Mich., a corporation of Delaware Application April 11, 1938, Serial No. 201,209

4 Claims. (Cl. 192—68)

This invention relates to friction clutches and is intended to provide an improvement in the clutch used for releasably coupling the engine shaft with the transmission shaft of a motor vehicle.

A major object of the invention is to secure smooth clutch engagement.

Another object is to make possible a simpler form of driven plate.

Another object is to reduce the number of parts used to support and position the clutch engaging spring.

Other objects include simplicity of construction and efficiency in operation.

In the drawing:

Figure 1 is a transverse section, the section being on line 1—1 of Figure 2.

Figure 2 is a view in elevation partly broken away and in section.

Figure 3 is a section corresponding to Figure 1 but with the parts displaced from the position shown by Figure 1.

Figure 4 is a partial plan view.

In the drawing, the engine shaft is marked 11. It has a flange 13 through which pass fastening means 15 securing a flywheel 17. Fastening means 19 secure to the flywheel a more or less conventional cover or abutment plate 21. The transmission or driven shaft is marked 23. Within the housing formed by the flywheel and cover a hub 25 is mounted in nonrotatable relation on the driven shaft. The hub carries a driven plate 27 with facings 29. A pressure plate 31 has lugs 33 received in slots 35 adjacent the margin of the cover, the pressure plate thereby rotating jointly with the flywheel but being axially reciprocable relative thereto.

In conventional clutches it has been found desirable and even necessary, in order to get the desired smooth clutch engagement, to provide axially directed tongues bent from the plane of the driven plate, these tongues generally being between the facings and serving to resiliently resist the pressure directed to effect clutch engagement. As the clutch engages, the spring fingers are restored to the plane of the driven plate. In the present invention an effort has been made to avoid the necessity for such fingers and yet to get the desired smooth engagement without the disadvantages attendant upon the use of such fingers.

The clutch engaging spring is marked 37. It is of the well-known coned annular form generally described as a Belleville spring. To avoid the large number of parts heretofore used to support and position the spring an annular shoulder 39 is formed on the pressure plate to engage the spring, the spring being somewhat flattened in the process of assembly between the circular regions at 39 and 41, the latter being formed on the cover. As is customary with such springs there are slots 43 forming yielding arms 45 to facilitate the action of clutch release. The inner ends of these arms are operably associated with a throwout ring 47 engaged by the forked ends 49 of what may be a conventional releasing lever.

To replace the fulcrum support carried by the cover in prior constructions there are used torsionally strained spring wires which also function to release the pressure plate when the spring load of spring 37 is removed therefrom. These spring wires serve the purpose of maintaining the centralized relation between the main spring 37 and the flywheel and cover. There are preferably three of such torsionally strained spring wires 51. Each is in effect a chord of the circle of the clutch ring. These torsionally strained wires are located between the pressure plate and the spring 37. Adjacent their ends the wires extend through openings 53 in the marginal flange 55 of the pressure plate. One end of each wire after passing through a pressure plate opening extends through a cover plate opening 57. The extremity of the wire at this end is bent and enters an anchoring cover opening at 59. The other end of the wire extends through a passage 61 in the cover dimensioned to conform to the wire. From passage 61 the wire is bent at 63 and again at 65, its extremity being directed radially. The extremity of the wire when it is unstressed occupies the dotted line position shown in Figure 4. When the wire is operably assembled its extremity is received within the pressure plate lug 33 (see Figure 1 and Figure 4). In the act of assembly the wire is torsionally strained as will be obvious. It will be seen that the end held in the cover at 59 resists the torsional twist given the wire and that the wire is held in position not only by this end 59 but by the passage for the wire formed at 61. It will be seen that the tension in the spring 51 tends to move the pressure plate away from the flywheel. The prestressed condition of the wire is only partially released because the lug 33 reaches the end of its movement when it encounters the wall 67 of the slot 35 and while the stressed condition of the wire still prevails.

Spring 37 is of such strength as to effectively overcome the resilient action of the spring wires.

When the throwout collar is moved to the left Figure 1, the spring load of the main spring 37 tends to be lifted from the reaction abutment 41 and to be assumed by the throwout collar. Thereupon the torsion wire moves the pressure plate to the right maintaining the contact between the pressure plate and the spring 37 and also the contact between the spring 37 and the cover. While the action may be explained as an intermittent action, the movement of the throwout collar relieving the load on the cover and the torsional spring moving the pressure plate and restoring the relation between the spring 37 and the cover plate and the pressure plate the action is obviously progressive and the pressure plate is always held in position.

I claim:

1. In a clutch having as parts thereof an axially fixed abutment and a reciprocable pressure plate, spring means reacting on said abutment and operable to move said pressure plate into clutch engaging position, means to take the reaction of said spring means from said abutment, a spring in the form of an axially twisted wire rod extending between the pressure plate and the abutment plate and operably connected to said abutment plate and pressure plate to offer yielding resistance to the movement of the pressure plate by the clutch engaging spring.

2. In a clutch having as parts thereof an axially fixed abutment and a reciprocable pressure plate, spring means reacting on said abutment and operable to move said pressure plate into clutch engaging position, means to take the reaction of said spring means from said abutment, a torsionally stressed wire spring between the pressure plate and the abutment plate and operably connected to said abutment plate and pressure plate to offer yielding resistance to the movement of the pressure plate by the clutch engaging spring, said torsional spring having its ends anchored to said abutment plate and said pressure plate, said spring between its ends extending as a chord of the circle, and that part of the chord adjacent the end which is anchored to the pressure plate being operably engaged with the abutment plate.

3. In a clutch, a driving member, a clutch cover secured thereto, a driven plate between said driving member and cover, a reciprocable pressure plate between said cover and driven plate, a prestressed Belleville spring engaging said pressure plate and reacting on said cover, a prestressed torsional wire spring between said Belleville spring and pressure plate, said wire spring being terminally anchored to said pressure plate and cover and extending through an opening in said cover adjacent its connection with the pressure plate, and means adjacent the axis of said clutch and movable to relieve said cover of the reaction of the Belleville spring whereby the torsion spring moves the pressure plate from clutch engaging position and maintains the contact between the cover and the Belleville spring.

4. The invention defined by claim 3, said pressure plate having an axial marginal flange, said flange having recesses for the passage of said torsional wire whereby said anchored ends of the wire are located outside the cover, said anchored ends terminating in radially inwardly directed parts to engage said cover and pressure plate.

WILLIAM S. WOLFRAM.